United States Patent [19]

Switall

[11] 4,211,258

[45] Jul. 8, 1980

[54] SPRAY DAMPENING SYSTEM FOR OFFSET PRINTING WITH PAGE CONTROL ASSEMBLY

[75] Inventor: Thomas G. Switall, Chicago, Ill.

[73] Assignee: Ryco Graphic Manufacturing, Inc., Wheeling, Ill.

[21] Appl. No.: 934,866

[22] Filed: Aug. 18, 1978

Related U.S. Application Data

[62] Division of Ser. No. 794,257, May 5, 1977, abandoned.

[51] Int. Cl.[2] ........................ F16K 31/143; B05B 1/14

[52] U.S. Cl. .................................... 137/862; 251/122; 251/62; 137/614.18; 239/574

[58] Field of Search ................. 251/121, 122, 118, 62; 137/614.18, 862; 239/574, 533.1

[56] References Cited

U.S. PATENT DOCUMENTS

| | | | |
|---|---|---|---|
| 1,759,892 | 5/1930 | Doen | 251/123 X |
| 2,295,871 | 9/1942 | Sloan et al. | 251/122 X |
| 2,345,840 | 4/1944 | Strong | 251/118 X |
| 3,622,078 | 11/1971 | Gronert | 251/62 X |

FOREIGN PATENT DOCUMENTS

| | | | |
|---|---|---|---|
| 592598 | 5/1925 | France | 137/614.18 |

*Primary Examiner*—Arnold Rosenthal
*Attorney, Agent, or Firm*—Lee & Smith

[57] ABSTRACT

The disclosed system controls, through novel pressure and valving adjustment mechanisms, the application of dampening fluid to the ink roll or offset plate on the plate cylinder of an offset printing press. The dampening fluid passes through a pressure compensator which adjusts the fluid pressure in response to changes in the speed of the press. The fluid at the adjusted pressure is then directed to a spray bar, where it is discharged through a plurality of nozzles. The fluid is directed to the spray bar by a multiple valve, page control assembly. In the page control assembly fluid from a common manifold is discharged through a plurality of dual control valves to respective nozzles. Closure elements for the respective valves are operated by air pistons. A plurality of needle elements for the respective valves are axially adjusted by a common manual control so that adjusting the manual control adjusts the amount of fluid from one segment of the spray bar, preferably corresponding to a full page.

19 Claims, 6 Drawing Figures

SPRAY DAMPENING SYSTEM FOR OFFSET PRINTING WITH PAGE CONTROL ASSEMBLY

CROSS REFERENCE TO RELATED APPLICATION

This is a division of application Ser. No. 794,257, filed May 5, 1977, now abandoned.

This application incorporates by reference copending application Ser. No. 722,623 filed Sept. 13, 1976 by Thomas G. Switall entitled "Spray Dampening System for Offset Printing", now U.S. Pat. No. 4,064,801, which is a continuation-in-part of application Ser. No. 604,016, filed Aug. 12, 1975, now abandoned.

SUMMARY OF THE INVENTION

The present invention is an improvement on the type of apparatus shown in FIGS. 8–12 of the referenced application in which a threaded knob positions a single needle element within a piston-operated valve closure sleeve.

The present invention enables a plurality of needle elements to be controlled simultaneously as well as the closure sleeves. In the embodiment discussed below, parallel air cylinders are spaced radially about a central axis. Each cylinder receives a piston-like valve closure sleeve member through which a slidable needle element extends. A screw drive arrangement positions a common drive member to which the ends of the needle elements are attached so that the drive member moves all of the needle elements simultaneously inward or outward. Each air cylinder is pressurized through ports formed by the intersection of the cylinder and a single annular chamber coaxial with the central axis. An air valve and additional ductwork supply air to the annular chamber.

DESCRIPTION OF THE PREFERRED EMBODIMENT

Figure 1:
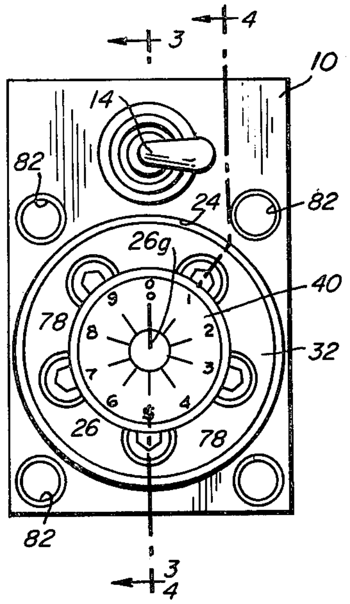
FIG. 1 is a front view of the page control assembly.

Reference numbers and figure numbers refer to the drawings in the present application rather than the referenced application unless otherwise indicated. FIGS. 1–4 illustrate a specific design for a page control assembly for adjusting the flow of dampening fluid to five spray nozzles (14, as shown in FIG. 12 of the referenced application). The page control assembly described in the present application takes the place of the fluid manifold 220 and air cylinder housing 232 serving five fluid lines 238 as shown in FIG. 8 of the referenced application. In the embodiment according to the present invention, the five fluid lines remain; however, the valves for adjusting the flow from the fluid manifold to the lines are arranged in a circular array instead of a row, and the five knobs 262a shown in FIG. 8 of the referenced application are replaced by a single knob controlling all five needle valves.

With reference to the drawing of the present application, a rectangular block 10, preferably of brass, is provided with an upper central bore 12 which receives an air toggle switch 14 of conventional design. A coaxial port 16 is formed in the bottom of the bore 12 at the rear of block 10 to accommodate a fitting for an air supply duct, for example, corresponding to line 274 in FIG. 12 of the referenced application. The block 10 is furnished with a central bore 18 which is in communication with the toggle switch 14 via a duct 20. The back portion of the bore 18 has a short coaxial bore 22 of reduced diameter. In the front of the block 10, there is a relatively large circular cavity 24 coaxial with the central bores 18 and 22.

The central bores 18 and 22 receive a tightly fitting solid steel shaft 26 which is keyed to the block to prevent rotation. As viewed in FIG. 4, the shaft 26 has an externally threaded section 26a which extends within and leftward of the cavity 24. Within the bore 18, the shaft 26 has an inner portion 26b grooved to receive an O-ring 28, having a diameter closely matching the diameter of the central bore 18. The portion 26b is followed by a portion 26c of slightly reduced diameter and another portion 26d with the same diameter as portion 26b. Shaft 26 terminates in an end portion 26e of the same diameter as the diameter of the short bore 22 with a coaxial threaded end bore 26f.

A cylindrical steel screw drive fitting 30 is threaded onto the solid end 26a of the shaft. Freely mounted on the screw drive fitting is a steel, puck-shaped needle drive member 32 having an outer diameter closely matching the diameter of the circular cavity 24 and fitted with an O-ring seal 34. A guide pin 32a is provided in corresponding aligned bores in the block 10 and needle drive member 32. The needle drive member 32 does not rotate but is trapped between split rings 36 and 38 received in corresponding ring grooves on the screw drive fitting 30. A knob 40 is fixed to the end of the screw drive fitting 30 by a set screw 42. When the member 32 is all the way in, the end of the stationary shaft 26 extends through a central aperture in the knob 40 and has a saw-cut 26g forming a radial line on the end to serve as a pointer as shown in FIG. 1.

Equally radially spaced about the central bore 18 are five bores 44, like the chamber of a revolver, forming five air cylinders parallel to the axis of the central bore 18 at the same axial location. Each air cylinder 44 terminates in a short throughbore 46 forming a shoulder against which a thin washer-shaped plastic bushing 48 is press-fit.

Figure 3:
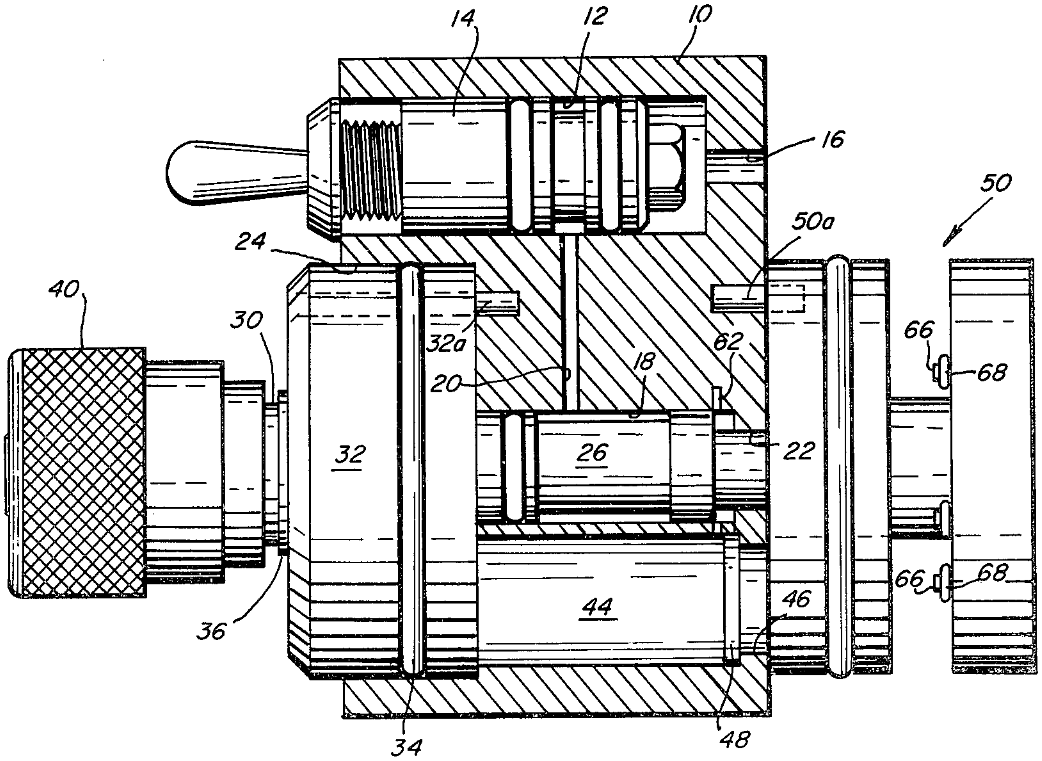
FIG. 3 is a sectional view of the page control assembly taken along lines 3—3 of FIG. 1 showing parts of the apparatus in elevation with the piston assemblies absent from the air cylinders.
Figure 4:
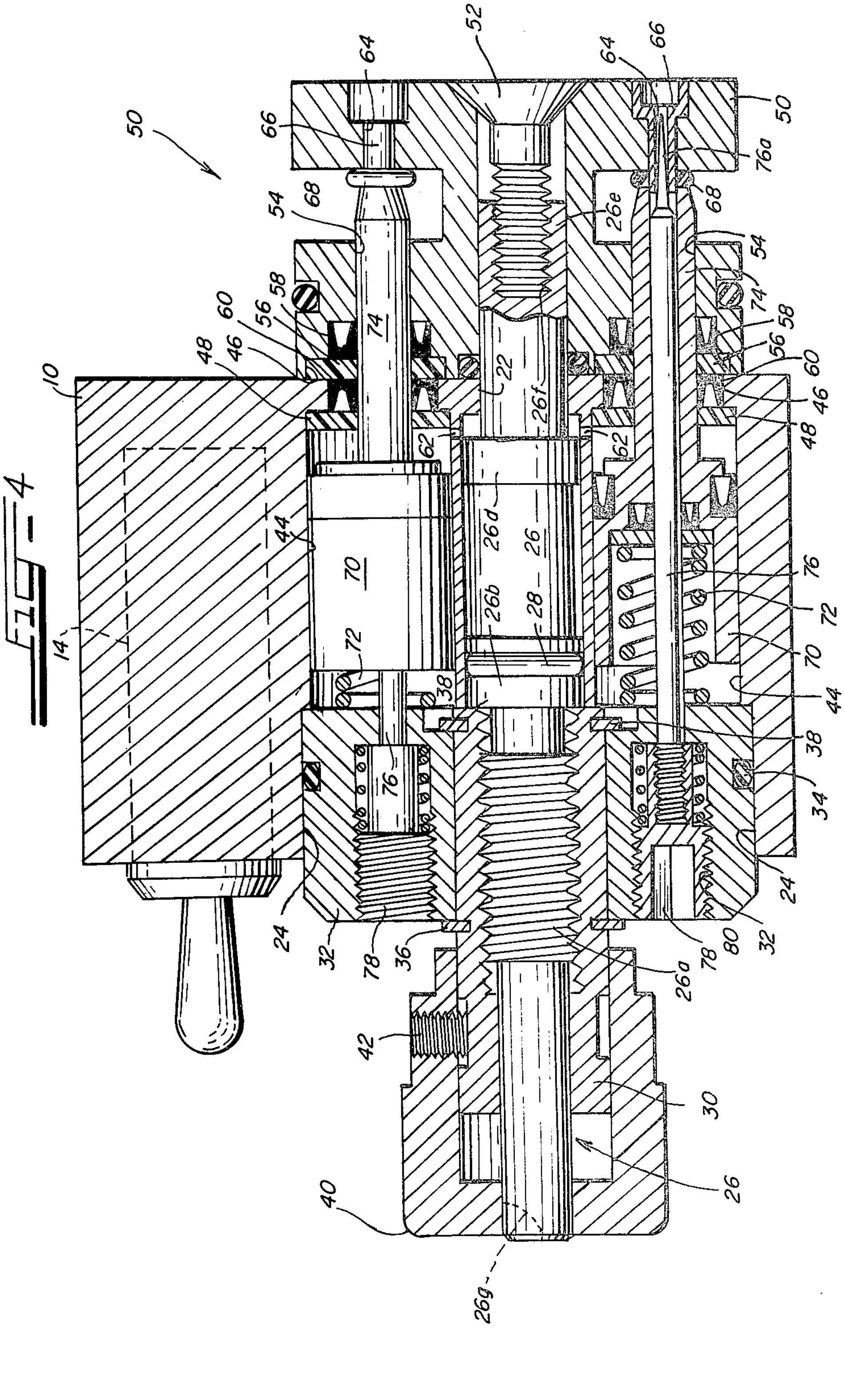
FIG. 4 is a detailed sectional view of the page control assembly of FIG. 1 taken along lines 4—4 of FIG. 1 with certain portions in elevation and with the closure sleeves and needle elements at their furthest rightward excursion as viewed in FIG. 4.

On the right-hand end 26e of the shaft as viewed in FIGS. 3 and 4, a spool-shaped steel manifold member 50 is coaxially received on the shaft end 26e and attached thereto with machine screw 52. The manifold member 50 is secured against rotation by guide pin 50a. The portion of the manifold member 50 adjacent to the block 10 has five bores 54 coaxial with the respective air cylinders 44 in the block 10. The bore 54 is counterbored in two steps to receive another washer-like plastic bushing 56 between the manifold member 50 and the block 10 and a seal ring 58 between the bushing 56 and the manifold member 50. Another seal ring 60 is positioned between the bushings in the bore 46.

An annular groove 62 is formed in the block 10 coaxially in the interior surface of the central bore 18 at the end adjacent to the throughbore 22. This groove 62 is of sufficient radius to intersect each one of the five air cylinders 44 to form a slotted window near one end of each one of the cylinders. This window provided by the groove 62 communicates with the interior of the bore 18 and, via the duct 20, with the air toggle switch 14.

The outer disc-shaped element of the manifold member 50 has five counter bored apertures 64 formed coaxially with the respective bores 54 and air cylinders 44. These apertures 64 receive cylindrical valve seat members 66 each of which has an end or orifice which protrudes into the annular space between the two much larger diameter discs of the manifold member 50. The protruding end of each valve seat 66 is fitted with an O-ring 68.

Each air cylinder 44 receives a corresponding piston assembly, as shown in FIG. 4, comprising a hollow piston 70 having an outer diameter closely matching the diameter of the air cylinder 44. In each cylinder a compression spring 72 has one end bearing against the flat inner surface of the needle drive member 32 and the other end bearing against the inside of the piston 70 and urging it rightward as viewed in FIG. 4. The piston member 70 is integrally formed with an elongated valve closure sleeve member 74 extending through the bushing 48, seal 60 inside the throughbore 46 and on through the adjacent disc-shaped portion of the manifold member 50 passing through the bushing 56, seal ring 58 and bore 54. Each sleeve member terminates in a beveled end in the annular space between the two disc-shaped portions of the manifold member 50. The inner diameter of the nose of the closure sleeve member of each piston is large enough to receive the protruding end of the valve seat 66 so that the nose of each closure member 74 comes into sealing contact with the respective O-ring 68 when the piston 70 is at its farthest rightward excursion within the cylinder. Each piston 70 carries suitable seal rings to make an airtight chamber within each air cylinder 44 to the right of the piston 70.

A needle element 76 extends completely through each piston assembly 70 and its closure sleeve member 74. Each of the five needle elements 76 comprises an elongated shaft having an end with a reduced diameter terminating in a tapered pinpoint coaxial with the axis of the respective valve seat 66. The diameter of the tapered point 76*a* increases to beyond the inner diameter of the valve seat 66. The opposite end of each needle element 76 is threaded into a set screw 78 which in turn is received in a threaded bore 80 in the needle drive member 32. A compression spring is arranged in each bore 80 to help retain the position of the set screw 78.

Figure 2:
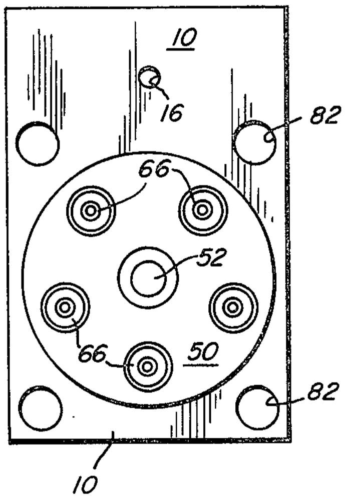
FIG. 2 is a rear view of the page control assembly of FIG. 1, showing the connections for the fluid lines.

The annular interior space of the manifold member 50 into which the ends of the closure sleeve members 74 and valve seat 66 protrude, forms a fluid manifold. Through-holes 82, shown in FIGS. 1 and 2, are supplied for bolting the page control assembly to a suitable fluid manifold assembly supplying fluid via the valve seat members 66 to the spray nozzles of the spray bar. Several page control assemblies may share a larger fluid manifold assembly. The larger ends of the valve seat members 66 flush with the end surface of the manifold member 50 are designed to receive fittings for attachment to respective fluid lines which are connected to respective spray nozzles (14, for example, in FIG. 12 of the referenced application).

Figure 5:
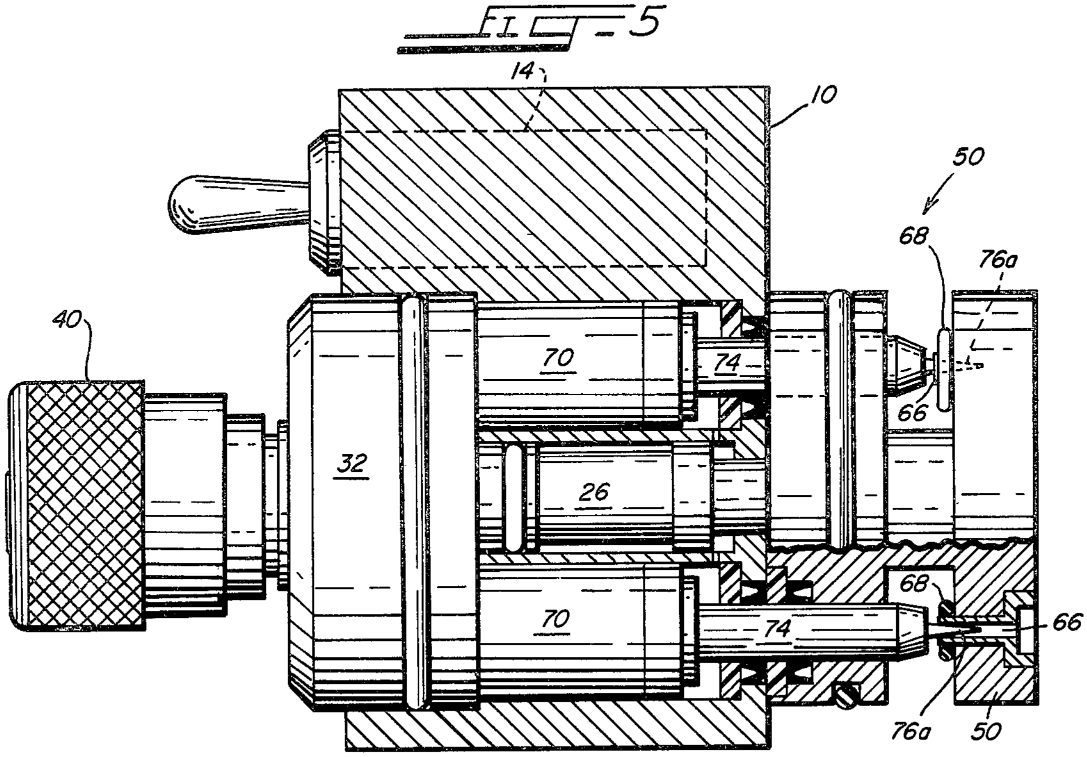
FIG. 5 is a sectional view similar to that of FIG. 4 illustrating leftward retraction of the valve closure sleeves.
Figure 6:
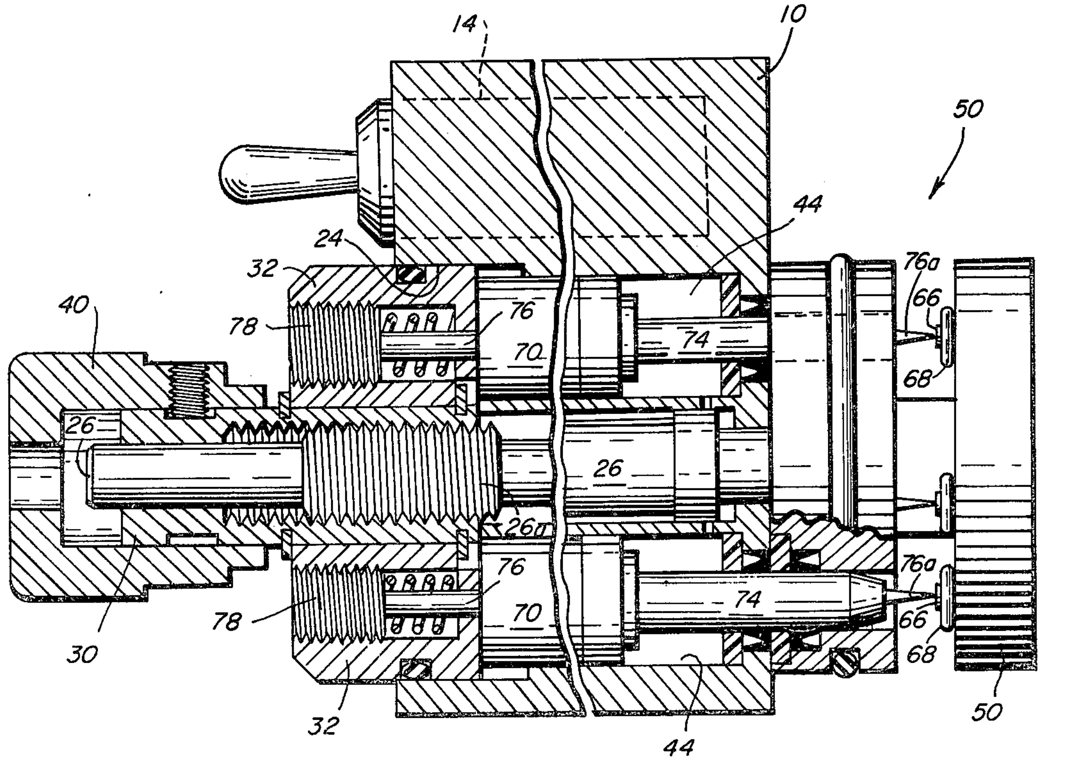
FIG. 6 is a sectional view similar to that of FIGS. 4 and 5 showing both the valve closure sleeves and the needle elements in their furthest leftward excursion.

In operation, the fluid in the annular manifold of the member 50 is prevented from flowing to the nozzles when the nose of each closure sleeve 74 rests firmly against the respective O-ring 68 by action of the spring 72 in the air cylinder 44. When the toggle switch 14 is actuated, each piston 70 is forced back by air pressure against the needle drive member 32 thus retracting the valve closure sleeves and freeing the entrance to each respective valve seat 66. as shown in FIG. 5. However, in FIG. 5 the needle drive member 32 is all the way in, that is, the drive member 32 has bottomed out in the cavity 24. Thus the tapered point 76*a* of each needle element is inserted well into each respective valve seat 66 thus greatly restricting the flow of dampening fluid through the valve orifice. To increase the flow, the knob 40 is rotated counterclockwise to withdraw the needle drive member 32 with a screw drive action. As the needle drive member is backed out of the cavity 24, as shown in FIG. 6, the member 32 retracts the five needle elements 76. The tips 76*a* are thus withdrawn from the valve seat 66 permitting a maximum flow of dampening fluid through the valve seat member 66. Each needle element 76 can be further retracted by applying an Allen wrench to the corresponding set screw 78 carried by the drive member 32.

The design of the page control assembly makes it possible to manually adjust the amount of spray dampening fluid reaching the press from a plurality of adjacent nozzles covering the width of one page. The importance of this feature lies in the assurance that the entire page will be of uniform quality rather than having portions printed in the presence of too little or too much dampening fluid. The assembly allows single knob control of a plurality of needle valves each having a respective piston-operated valve closure device. The arrangement of these elements in the preferred embodiment results in an extremely compact and smoothly operating mechanism retaining the capability of simple independent adjustment of each needle valve.

Although it is not the peferred embodiment, it is possible for an arrangement of the type described in the present application to be adapted for automatic needle valve adjustment in a manner which will be apparent to those skilled in the art from FIGS. 11 and 12 of the referenced application.

The foregoing description of the apparatus has been given as an example of the presently preferred embodiment. Various modifications of the size, arrangement, number, structure and material of the various components can be made without departing from the principle of the invention disclosed herein or the scope of the following claims.

I claim:

1. A compound valve assembly, comprising:

a solid body with a central axis defined therein;

a plurality of chambers forming cylinders defined in said body, each extending parallel to said central axis and spaced radially about said central axis at approximately the same axial location;

a plurality of valves having respective inlet orifices radially spaced about said central axis and aligned with respective ones of the cylinders;

manifold means for communicating each of said orifices with a fluid;

a plurality of piston members slidably received in respective ones of said cylinders, each piston member having a closure sleeve extending from one end thereof toward a respective orifice and formed such that engagement of the end of the closure sleeve with the orifice closes the respective valve while retraction of the closure sleeve from the orifice opens the respective valve;

a circular fluid chamber formed about said central axis intersecting each of said cylinders;

ductwork formed in said body communicating said circular chamber with a source of pressurized fluid for operating said piston members;

a plurality of needle elements each extending in parallel through said piston members and closure sleeves and having a tapered tip at one end axially introducible into the orifice of a respective valve to restrict the flow of fluid into the orifice;

a common drive member surrounding said central axis, the opposite ends of said needle elements being attached to said drive member; and a screw drive mounted to said body coaxial with said central axis for advancing and retracting said common member to introduce and withdraw all of said needle elements at once.

2. The assembly of claim 1, wherein said body has an aperture formed on the side opposite from the valve orifices about the central axis and said common drive member is slidably received in said aperture.

3. The assembly of claim 2, wherein said aperture is in communication with each of said cylinders such that the excursion of said piston members is defined by said common drive member.

4. The assembly of claim 3, wherein each cylinder has spring means between the common drive member and the piston member for urging said piston member in a direction to cause said closure element to close the respective valve.

5. The assembly of claim 1, further comprising a central shaft affixed to and extending through said body coaxially with said central axis, a manifold element being mounted to said shaft adjacent to said body;

means in said manifold element defining an annular fluid manifold, said valve orifices being mounted on said manifold element in communication with said annular manifold, said closure sleeve and needle elements extending through a portion of said manifold element into said annular manifold, and the opposite end of said shaft being threaded to receive said screw drive for advancing said common drive member.

6. The assembly of claim 5, wherein each said orifice includes a tube projecting from said manifold element into said annular manifold and an O-ring seal surrounding the projecting end of said tube, said closure sleeve receiving the end of said tube and bearing against said O-ring when the valve is closed.

7. The assembly of claim 5, wherein said body has a cylindrical bore for receiving said shaft and said circular fluid chamber is an annular groove formed at one end of said bore intersecting said cylinders.

8. The assembly of claim 7, wherein said ductwork includes means in said body defining a duct passing from said bore between adjacent cylinders to a source of pressurized fluid.

9. The assembly of claim 8, further comprising valve means operatively received in said body communicating with said duct.

10. The assembly of claim 9, wherein said valve means is a fluid toggle switch.

11. The assembly of claim 1, wherein said common drive member has means for separately adjusting the axial position of each of said needle elements.

12. The assembly of claim 11, wherein said means for adjusting the axial position of each of said needle elements includes respective set screws carried by said drive member.

13. The assembly of claim 1, wherein the excursion of said piston members is defined by said common drive member.

14. The assembly of claim 13, wherein each cylinder has spring means between the drive member and each piston member for urging said piston member in a direction to cause said closure element to close the respective valve.

15. A fluid valve assembly comprising:

a valve body having a fluid passage therethrough including an inlet orifice and an outlet orifice, said inlet orifice being in communication with a main fluid source;

a value closure member comprising a sleeve mounted for reciprocal movement toward and away from engagement with one of said orifices;

means urging said valve closure member toward engagement with said one orifice to close said fluid passage and stop flow of main fluid therethrough;

a chamber formed in said valve body isolated from said fluid passage;

a piston member mounted for reciprocal movement within said chamber and operatively connected to said valve closure member;

means formed in said valve body for placing said chamber on one side of said piston member in communication with a source of pressurized valve operating fluid, whereby said piston will be moved in a direction to effect corresponding movement of said valve closure member away from said one orifice to open said fluid passage and permit the flow of main fluid therethrough;

a valve restriction member mounted for movement within said valve body fluid passage to adjustably restrict the flow of main fluid through said fluid passage, said valve restriction member being mounted within said sleeve and concentric therewith; and manually operable drive means for moving said valve restriction member to selected positions of adjustment.

16. The valve assembly of claim 15 wherein said valve restriction member is a needle element having a tapered tip axially introducible into said one orifice.

17. The valve assembly of claim 16 wherein said manually operable drive means is a threaded element connected to said needle element and having a manually rotatable portion for adjusting said threaded element and said needle element connected thereto.

18. A fluid valve assembly comprising:

a body having a fluid passage therethrough;

a chamber forming a cylinder in said body isolated from said fluid passage;

a valve having an inlet orifice aligned with the cylinder;

manifold means for placing said inlet orifice in communication with a main fluid source;

a piston member slidably received in said cylinder; said piston member having a valve closure member operatively connected to said piston member and mounted for movement toward and away from said orifice and formed such that engagement of the end of the closure member with the orifice closes the valve while retraction of the closure member from the orifice opens the valve;

means urging said closure member toward engagement with said orifice to close the valve;

means formed in said body for placing said chamber on one side of said piston member in communication with a source of pressurized valve operating fluid to move said piston and said closure member away from said orifice and thereby open said valve;

a valve restriction member having a tip at one end axially introducible into said body fluid passage to restrict the flow of main fluid through said fluid passage, said valve closure member comprising a sleeve surrounding said valve restriction member and concentric therewith; and a screw drive mounted to said body for advancing and retracting said valve restriction member within said valve body passage to adjust the restriction of main fluid flow therethrough.

19. A valve assembly, comprising:

a solid body;

a chamber forming a cylinder defined in said body;

a valve having an inlet orifice aligned with the cylinder;

manifold means for communicating said orifice with a fluid;

a piston member slidably received in said cylinder, said piston member having a closure sleeve extending from one end thereof toward said orifice and formed such that engagement of the end of the closure sleeve with the orifice closes the valve while retraction of the closure sleeve from the orifice opens the valve;

a fluid chamber formed in said cylinder;

ductwork formed in said body communicating said chamber with a source of pressurized fluid for operating said piston member;

a needle element extending through said piston member and closure sleeve and having a tapered tip at one end axially introducible into the orifice of said valve to restrict the flow of fluid into the orifice; and a screw drive mounted to said body for advancing and retracting said needle element.

* * * * *